(12) United States Patent
Lee et al.

(10) Patent No.: US 8,811,543 B2
(45) Date of Patent: Aug. 19, 2014

(54) RECEIVING APPARATUS IN OFDM SYSTEM AND RECEIVING METHOD

(75) Inventors: Young Ha Lee, Daejeon (KR); Hye Kyung Jwa, Daejeon (KR); Dae Ho Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 77 days.

(21) Appl. No.: 13/588,361

(22) Filed: Aug. 17, 2012

(65) Prior Publication Data

US 2013/0243130 A1 Sep. 19, 2013

(30) Foreign Application Priority Data

Mar. 19, 2012 (KR) .................. 10-2012-0027915

(51) Int. Cl.
*H03D 1/00* (2006.01)
*H04L 27/06* (2006.01)

(52) U.S. Cl.
USPC ............ 375/340; 375/260; 375/316; 375/324

(58) Field of Classification Search
USPC ................................. 375/340, 260, 316, 324
See application file for complete search history.

(56) References Cited

U.S. PATENT DOCUMENTS

| 2006/0067441 A1* | 3/2006 | Park et al. .................... 375/346 |
| 2008/0019331 A1* | 1/2008 | Thomas et al. ............... 370/338 |
| 2008/0273580 A1* | 11/2008 | Sundstrom et al. .......... 375/219 |
| 2010/0002785 A1 | 1/2010 | Mantravadi et al. |

FOREIGN PATENT DOCUMENTS

JP 2007-110333 4/2007

* cited by examiner

*Primary Examiner* — Ted Wang
(74) *Attorney, Agent, or Firm* — Nelson Mullins Riley & Scarborough LLP; Anthony A. Laurentano, Esq.; Dipti Ramnarain, Esq.

(57) ABSTRACT

Disclosed are a receiving apparatus and a receiving method. More particularly, disclosed are a receiving apparatus and a receiving method in an OFDM system. The receiving apparatus in the OFDM system includes a receiver for receiving wireless signals transmitted through wireless channels, a transformer for transforming the wireless signals into signals of a frequency domain, an inverse transformer for inversely transforming reference signals into signals of a time domain based on a number of reference signals included in the signals of the frequency domain and an arrangement interval of the reference signals included in the signals of the frequency domain, and a determiner for determining a delay spread based on the inversely transformed signals of the time domain.

20 Claims, 4 Drawing Sheets

RECEIVING APPARATUS IN OFDM SYSTEM AND RECEIVING METHOD

CROSS-REFERENCE TO RELATED APPLICATIONS

This application claims priority to and the benefit of Korean Patent Application No. 10-2012-0027915 filed in the Korean Intellectual Property Office on Mar. 19, 2012, the entire contents of which are incorporated herein by reference.

TECHNICAL FIELD

The present invention relates to a receiving apparatus and a receiving method, and more particularly to a receiving apparatus in an OFDM system and a receiving method.

BACKGROUND ART

In general, an orthogonal frequency division multiplexing (OFDM) is a scheme suitable for high speed data transmission in wired and wireless channels, and is currently adopted as a transmission scheme for several high speed communication systems. That is, when a single subcarrier scheme is used when high speed data having a short symbol period is transmitted in a wireless communication channel, inter-symbol interference is more serious, and thus complexity of a receiving end is significantly increased. However, when a multi-subcarrier scheme is used, a symbol period in each subcarrier can be expanded as many as a number of subcarriers while a data transmission rate is still maintained, so that a simple equalizer having one tap can effectively deal with a serious frequency selective fading channel due to a multi-path.

Since the OFDM scheme uses a plurality of subcarriers having the orthogonality, the efficiency in using a frequency is increased, and processes of modulating and demodulating the plurality of subcarriers by a transmitting end have the same results as those generated by performing an inverse discrete Fourier transform (IDFT) and a discrete Fourier transform (DFT), respectively, and thus the OFDM scheme can be implemented using an inverse fast Fourier transform (IFFT) and a fast Fourier transform (FFT) at high speed. Such an OFDM scheme is adopted as a standard scheme in several communication systems since the OFDM scheme is suitable for high speed data transmission.

Meanwhile, an OFDM signal having passed through a multi-path fading channel is affected by a frequency selective channel in a frequency domain. Accordingly, for stable channel estimation, a pilot signal is generally transmitted to a position of a particular subcarrier so as to adopt a change in a channel in the frequency domain. At this time, an interval between respective pilot signals is designed in consideration of a size of a delay spread of the multi-path fading channel. If the size of the delay spread is increased and the change in the channel within a determined pilot interval is increased, a channel estimation error is generated, thereby causing serious demodulation capability deterioration. In order to minimize the capability deterioration, characteristics of the multi-path fading channel should be known in the process of estimating the channel, and information on the delay spread of the channel plays an important role among the characteristics.

Meanwhile, an OFDM receiver using a pilot signal carried on a particular subcarrier at regular intervals directly performs initial channel estimation only in a position of the pilot signal, and channel estimation for a data signal between pilot signals is performed through an interpolation scheme and the like using channel estimation values of the pilot signals. Initial channel estimation values in pilot positions are used for estimation of the delay spread of the multi-path fading channel, and the accuracy of the interpolation scheme may be increased through an estimated spread delay value.

SUMMARY OF THE INVENTION

The present invention has been made in an effort to provide a receiving apparatus and a receiving method which satisfy low power in a receiving apparatus and a receiving method using an OFDM modulation/demodulation scheme, so that it is possible to design an apparatus and a procedure having a structure for the same.

An exemplary embodiment of the present invention provides a receiving apparatus in an OFDM system including: a receiver for receiving wireless signals transmitted through wireless channels; a transformer for transforming the wireless signals into signals of a frequency domain; an inverse transformer for inversely transforming reference signals into signals of a time domain based on a number of reference signals included in the signals of the frequency domain and an arrangement interval of the reference signals included in the signals of the frequency domain; and a determiner for determining a delay spread based on the inversely transformed signals of the time domain.

Another exemplary embodiment of the present invention provides a receiving method in an OFDM system including the steps of: receiving wireless signals received through wireless channels by a receiver; transforming the wireless signals into signals of a frequency domain by a transformer; inversely transforming reference signals into signals of a time domain based on a number of reference signals included in the signals of the frequency domain and an arrangement interval of the reference signals included in the signals of the frequency domain, by an inverse transformer; and determining a delay spread based on the inversely transformed signals of the time domain by a determiner.

According to exemplary embodiments of the present invention, it is possible to obtain an effect of implementing an apparatus and a procedure having a structure of receiving low power by performing channel estimation of a frequency domain by using a reference signal allocated to the frequency domain in a mobile communication terminal using an OFDM modulation/demodulation scheme.

That is, it is possible to provide an advantage of implementing a low power design without capability deterioration through channel estimation for compensating for a signal distortion due to a multi-path fading in a receiving apparatus or a mobile communication terminal.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
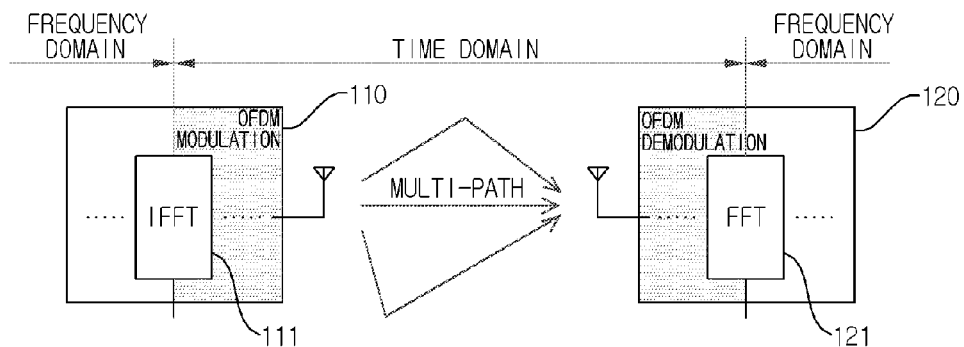
FIG. 1 is a diagram for describing a multi-path fading of an OFDM system.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

The following description merely illustrates principles of the present invention. Therefore, although not clearly described and illustrated in this specification, those skilled in the art can implement the principles of the present invention and invent various apparatuses included in the concept and range of the present invention. All of the conditional terms and embodiments stated in this specification are obviously intended only for the purpose of making the concept of the present understood in principle, and the present invention should be construed to be not limited to the stated embodiments and states in particular.

All statements herein reciting principles, aspects, and embodiments of the invention, as well as specific examples thereof, are intended to encompass both structural and functional equivalents thereof. Additionally, it is intended that such equivalents include currently known equivalents as well as equivalents developed in the future, i.e., any elements developed that perform the same function, regardless of the structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudo code, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared.

Explicit use of the term "processor" or "controller", or the term provided as a similar concept to the term should not be construed to refer exclusively to hardware capable of executing software, and may include, without limitation, digital signal processor (DSP) hardware, read only memory (ROM) for storing software, random access memory (RAM), and non-volatile storage.

In the claims of the present invention, elements represented as means for performing a function described in the detailed description are intended to include, for example, all methods for performing functions including all types of software including combinations of circuit devices performing functions or firmware/micro code and the like, and they are combined with appropriate circuits to implement the software to perform the functions. Since the present invention defined by such claims is combined with functions supplied by the means variously explained and combined with methods required by the claims, it should be understood that any means capable of supplying the functions are equivalent to those understood from the present specification.

The above and other aspects, features, and advantages of the present invention will be more apparent from the following detailed description taken in conjunction with the accompanying drawings, and accordingly those skilled in the art can easily implement the technical idea of the present invention. A detailed description of known functions and configurations incorporated herein will be omitted when it may make the subject matter of the present invention rather unclear. Hereinafter, exemplary embodiments according to the present invention will be described in detail with reference to the accompanying drawings.

This specification discloses receiving apparatus and a receiving method which can satisfy low power in a receiving apparatus and a receiving method using an OFDM modulation/demodulation scheme, and thus it is possible to design an apparatus and a procedure having a structure for the same.

A mobile communication system using the OFDM modulation/demodulation scheme has a frequency selective channel environment due to a multi-path fading.

FIG. 1 is a diagram for describing a multi-path fading of an OFDM system.

Referring to FIG. 1, a transmitting end 110 wirelessly transmits a signal of a frequency domain to a time domain through an inverse fast Fourier transform (IFFT) 111, and a receiving end 120 performs demodulation through a fast Fourier transform (FFT) 121. The fast Fourier transformed (FFT) 121 signal has a difficulty in demodulation due to the multi-path fading in the time domain corresponding to a wireless channel. In order to solve the above-mentioned problem, the transmitting end 110 transmits a known signal such as a pilot or a reference signal to a particular subcarrier in the frequency domain and the receiving end 120 performs channel estimation and compensation.

Figure 2:
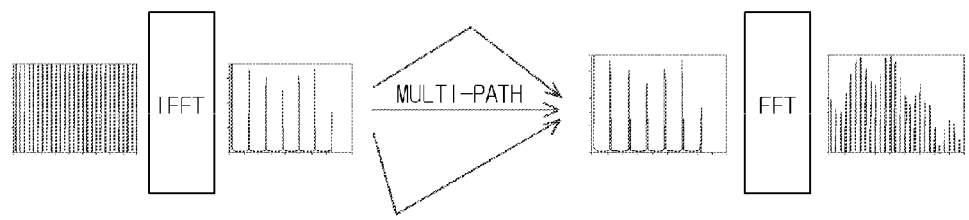
FIG. 2 is a diagram for describing a distortion phenomenon of a reference signal in the OFDM system of FIG. 1.

FIG. 2 is a diagram for describing a distortion phenomenon of a reference signal in the OFDM system of FIG. 1.

Referring to FIG. 2, there are three paths when a transmitting end transmits only a reference signal, and OFDM demodulation is performed on the reference signal when respective received powers are different. It can be identified that the received signals are distorted due to the fading phenomenon by the multi-path. However, the receiving end recognizes the distortion since the reference signal is a signal already known to the receiving end, and the receiving end can estimate transmission data carried on the subcarrier between reference signals based on the recognition. A Least Square (LS) estimator may be used for the received signal and the reference signal known to the receiving end.

A method of reconstructing the transmission data between the reference signals by using such an estimator includes a linear interpolation method. This method has a very simple structure in which transmission data between estimated reference signals is reconstructed using the linearity, but has a disadvantage of a low reconstruction capability. Accordingly, in order to compensate for such a disadvantage, the transmission data may be reconstructed with the estimated reference signals by using a filter. However, this method should use a filter having the high implementation complexity since a large number of taps are required for a capability satisfaction.

Figure 3:
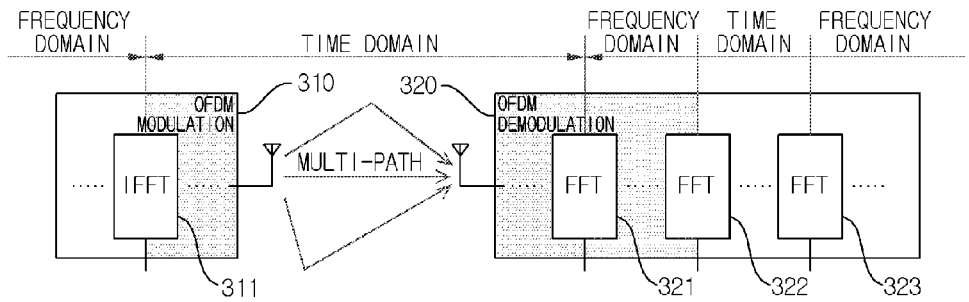
FIG. 3 is a diagram for describing a channel estimating method using a Fourier transform.

FIG. 3 is a diagram for describing a channel estimating method using a Fourier transform.

Referring to FIG. 3, when a transmitting end 310 transmits a wireless signal through a wireless channel like FIG. 1, a receiving end 320 receives and demodulates 321 the wireless signal. The demodulated reference signal is changed to a signal of the time domain again, and a delay spread in the time domain is estimated 322. The signal of the time domain is transformed into a signal of the frequency domain again, and the received signal is reconstructed 323. The receiving end 320 having such a structure has the high implementation complexity. In general, a fast Fourier transformer may be a disadvantage for implementing a low power terminal modem in that high power consumption due to the use of a memory having a size corresponding to an OFDM symbol size.

Accordingly, it is required to reduce a memory of an inverse fast Fourier transformer for transforming the signal of the frequency domain to the signal of the time domain.

Figure 4:
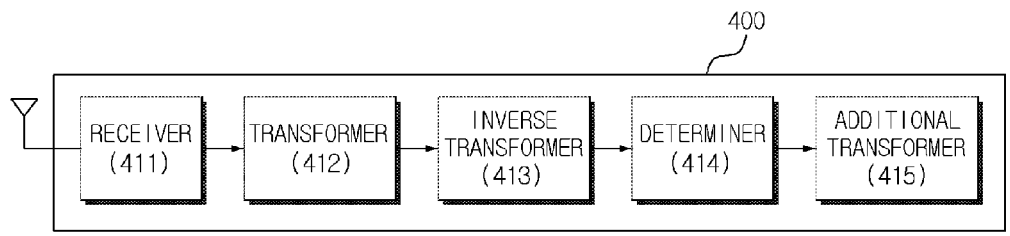
FIG. 4 is a diagram for describing a receiving apparatus in an OFDM system disclosed in this specification.

FIG. 4 is a diagram for describing a receiving apparatus in an OFDM system disclosed in this specification.

Referring to FIG. 4, a receiving apparatus 400 in the OFDM system includes a receiver 411 for receiving a wireless signal transmitted through a wireless channel, a transformer 412 for transforming the wireless signal to a signal of the frequency domain, an inverse transformer 413 for inversely transforming a reference signal to a signal of the time domain based on a number of reference signals included in signals of the frequency domain and an arrangement interval of the reference signals in signals of the frequency domain, and a determiner 414 for determining a delay spread based on the inversely transformed signal of the time domain.

The wireless channel may be a multi-path fading environment, and the wireless signal may be a signal including the reference signal and a data signal. The wireless signal including the reference signal and the data signal may be a signal allocated to the subcarrier. The reference signal may include a signal for estimating a channel, and the signal includes a pilot signal as an example.

The transformer 412 for performing the transform into the signal of the frequency domain may perform the transform by using the fast Fourier transformer, and the inverse transformer 413 for performing the transform into the signal of the time domain may perform the transform by using the inverse fast Fourier transformer.

The inverse transformer 413 inversely transforms the reference signal to the signal of the time domain based on the number of reference signals and the arrangement interval of the reference signals in the signals of the frequency domain. At this time, the inverse transformer 413 reduces an amount of operations by performing the inverse transform only for the reference signal, and reduces memory resources used for the inverse transform. Accordingly, a low power receiving apparatus may be implemented. In the inverse transform, the remaining data signals except for the reference signals may be interpolated to "0".

The receiving apparatus 400 can pre-store information on the reference signal. The data carried on the subcarrier may be estimated by using information on the reference signal transmitted through the wireless channel and the pre-stored information on the reference signal.

The reference signals are disposed on the subcarriers according to an arrangement interval. The arrangement interval may be set in consideration of a size of the delay spread of the multi-path fading channel.

The inverse transform into the signal of the time domain is separately performed based on a central subcarrier. In this case, the central subcarrier is allocated "0", and resources are not allocated to such a subcarrier.

The separately performed inverse transform may have different offset values. That is, when the central subcarrier is "0", the allocation to the subcarriers is different based on the central subcarrier, and accordingly the offset values are different based on the central subcarrier.

The inverse transform into the signal of the time domain may be performed for the reference signal transformed into the signal of the frequency signal in a sample of a preset area. The preset area may be the remaining area except for a sample of a central area among samples of the OFDM symbol. That is, the inverse transform can be performed for only a sample area of a beginning part and a sample area of an ending part of the OFDM symbol samples.

The determiner 414 can determine a maximum delay value of the inversely transformed signal of the time domain based on a preset threshold.

Meanwhile, the receiving apparatus 400 in the OFDM system may further include an additional transformer 415 for transforming the signal of the time domain corresponding to the determined maximum delay value into the signal of the frequency domain, and the additional transformer 415 may be implemented by the fast Fourier transformer.

Figure 5:
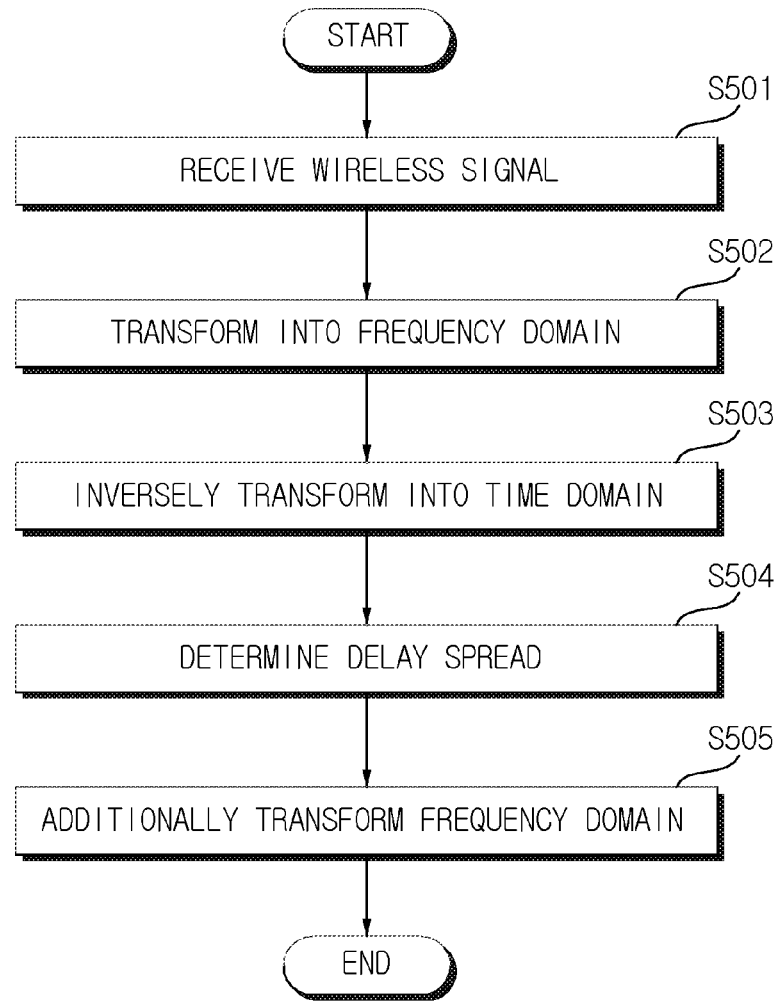
FIG. 5 is a diagram for describing a receiving method in the OFDM system disclosed in this specification.

FIG. 5 is a diagram for describing a receiving method in the OFDM system disclosed in this specification.

Referring to FIG. 5, a receiving method in the OFDM system includes the steps of receiving a wireless signal transmitted through a wireless channel (step S501), transforming the wireless signal into a signal of the frequency domain (step S502), inversely transforming a reference signal into a signal of the time domain based on a number of reference signals included signals of the frequency domain and an arrangement interval of the reference signals in the signals of the frequency domain (step S503), and determining a delay spread based on the inversely transformed signal of the time domain (step S504).

Information on the reference signals may be pre-stored, and the reference signals may be disposed on the subcarriers at arrangement intervals.

The inverse transform may be separately performed based on the central subcarrier, and the central subcarrier is allocated "0". Here, the separately performed inverse transforms have different offset values.

Meanwhile, the inverse transform may be performed for the reference signal transformed into the signal of the frequency signal in a sample of a preset area. Here, the preset area may be the remaining area except for a sample of a central area among samples of the OFDM symbol.

Meanwhile, the step of determining the delay spread (step S504) can determine a maximum delay value of the inversely transformed signal of the time domain based on a preset threshold.

The receiving method in the OFDM system may further include the step of additionally transforming the signal of the time domain corresponding to the determined maximum delay value into the signal of the frequency domain.

A detailed description of the receiving method in the OFDM system will be herein omitted since it overlaps with the description of FIG. 4.

Hereinafter, a concrete exemplary embodiment will be described in detail with reference to the drawing.

In this exemplary embodiment, a 3GPP LTE downlink is described as an example.

Figure 6:
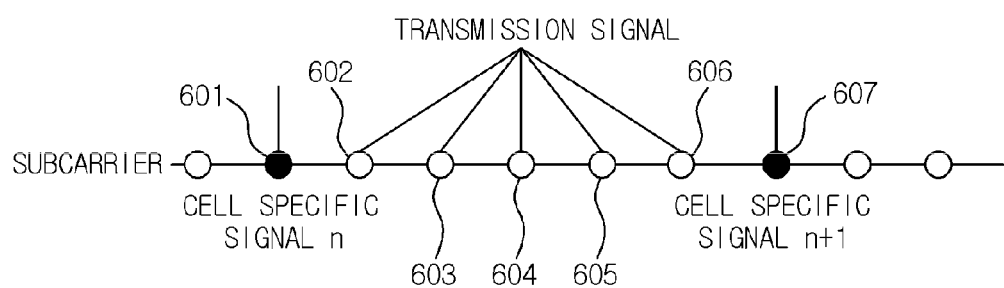
FIG. 6 is a diagram for describing a downlink cell specific reference signal allocation interval in 3GPP LTE.

FIG. 6 is a diagram for describing a downlink cell specific reference signal allocation interval in 3GPP LTE.

Referring to FIG. 6, a reference signal arrangement in an OFDM symbol in which cell specific reference signals 601 and 607 of downlink reference signals are arranged is allocated for every six subcarriers. That is, the receiving end estimates the reference signals arranged for every six subcarriers and thus reconstructs transmission signals 602, 603, 604, 605, and 606 transmitted through multi-path.

In 3GPP LTE, a maximum of 110 resource blocks (RBs) are transmitted to one symbol, and there are two cell specific reference signals in one resource block. It means that there are a maximum of 220 estimated signals for reference signals among signals demodulated through the FFT in the receiving end. The estimated signals should be inverse Fourier transformed to obtain a maximum delay spread in the time domain. Such a method of reconstructing the transmission signal by obtaining only the maximum delay spread in the time domain and performing the Fourier transform into the frequency domain again corresponds to a conventional method.

This exemplary embodiment describes a structure of performing the Fourier transform by obtaining the maximum delay spread by using only the estimated reference signal for obtaining the maximum delay spread.

Based on 3GPP LTE, an equation of obtaining the general inverse Fourier transform by taking a zero interpolation from the estimated reference signal is defined as Equation 1.

$$x(n) = \sum_{k=0}^{N-1} X(k) e^{\frac{2\pi}{N} nk}, \quad n = 0 \sim N-1 \quad \text{[Equation 1]}$$

In Equation 1, N corresponding to a number of samples is 2048 in a case of 3GPP LTE. This equation corresponds to a general N-Point inverse Fourier transform equation. X(k) denotes an estimated reference signal. There exist a maximum of 220 estimated reference signals in the case of 3GPP LTE, and the remaining signals are interpolated to "0". Since only a maximum delay spread is taken from x(n), one maximum delay spread is allocated for every six reference signals, and a number of maximum delay spreads does not exceed 256 due to the existence of guard carriers in the OFDM signals when N is 2048. Accordingly, an originally required inverse Fourier transform equation may be simplified to Equation 2 and Equation 3.

$$x(n) = \sum_{k=0}^{2047} X(k) e^{\frac{2\pi}{2048} nk}, \quad n = 0 \sim 2047 \quad \text{[Equation 2]}$$

$$x(n) = \sum_{k'=0}^{219} X(6k' + \beta) e^{\frac{2\pi}{2048} n(6k' + \beta)}, \quad n = 0 \sim 255 \quad \text{[Equation 3]}$$

The following two matters should be considered in Equations 2 and 3.

First, when reference signals are allocated within resources blocks on subcarriers, the central subcarrier, which is a DC subcarrier, is allocated "0" without the allocation of the resource. It means that the allocation of subcarriers is different based on the central subcarrier. Then, it means that β has different values based on the centeral subcarrier in Equation 3.

Second, as a result of actual channel characteristics, a value of n taking the maximum delay spread takes only a value larger than a threshold among values of 0 to 199 and 1992 to 2047 and performs the fast Fourier transform for transforming into the frequency domain. Accordingly, Equation 4 below may be defined by considering the above.

$$x(n) = \sum_{k'=0}^{109} \left\{ X(6k' + \beta_1) e^{\frac{2\pi}{2048} n(6k' + \beta_1)} + X(6k' + \beta_2) e^{\frac{2\pi}{2048} n(6k' + \beta_2)} \right\}, \quad \text{[Equation 4]}$$

$$n = 0 \sim 199, \; 1992 \sim 2047$$

Equation 4 is finally equal to the performance of the 2048-Point inverse Fourier transform, but has smaller amount of operations. The smaller amount of operations is possible because the channel estimation is performed with only the reference signal, and only the maximum delay spread of the time domain is taken.

Figure 7:
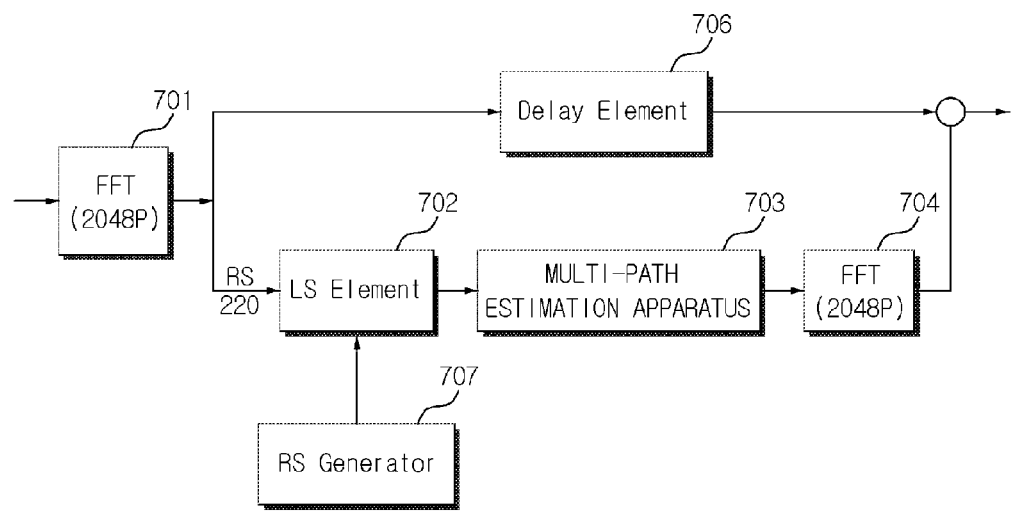
FIG. 7 is a diagram for describing a whole configuration of a channel estimation and compensation apparatus.

FIG. 7 is a diagram for describing a whole configuration of a channel estimation and compensation apparatus.

Referring to FIG. 7, a received signal is fast Fourier transformed 701, and fast Fourier transformed again 704 via an LS estimator 702 by an RS generator 707 and a multi-path estimation apparatus 703. The signals fast Fourier transformed again are compensated with the reflection 705 of a delay element 706.

In Equation 4, $$e \frac{2\pi}{2048} n(6k' + \beta 1) \text{ and } e \frac{2\pi}{2048} n(6k' + \beta 2)$$

are twiddle factors existing within a single circle for a phase rotation, and, in the conventional 2048-Point inverse Fourier transform, 2048 samples should be stored. However, in this embodiment, multiples of 6 and offset values of the multiples of 6 are stored, and 2048 number of operations is reduced to 220 number of operations. The reduction of operations is possible because the operations are performed with only a result of the estimated reference signals, and thus the operations are performed only for 220 subcarriers corresponding to the reference signals among 2048 subcarriers.

Figure 8:
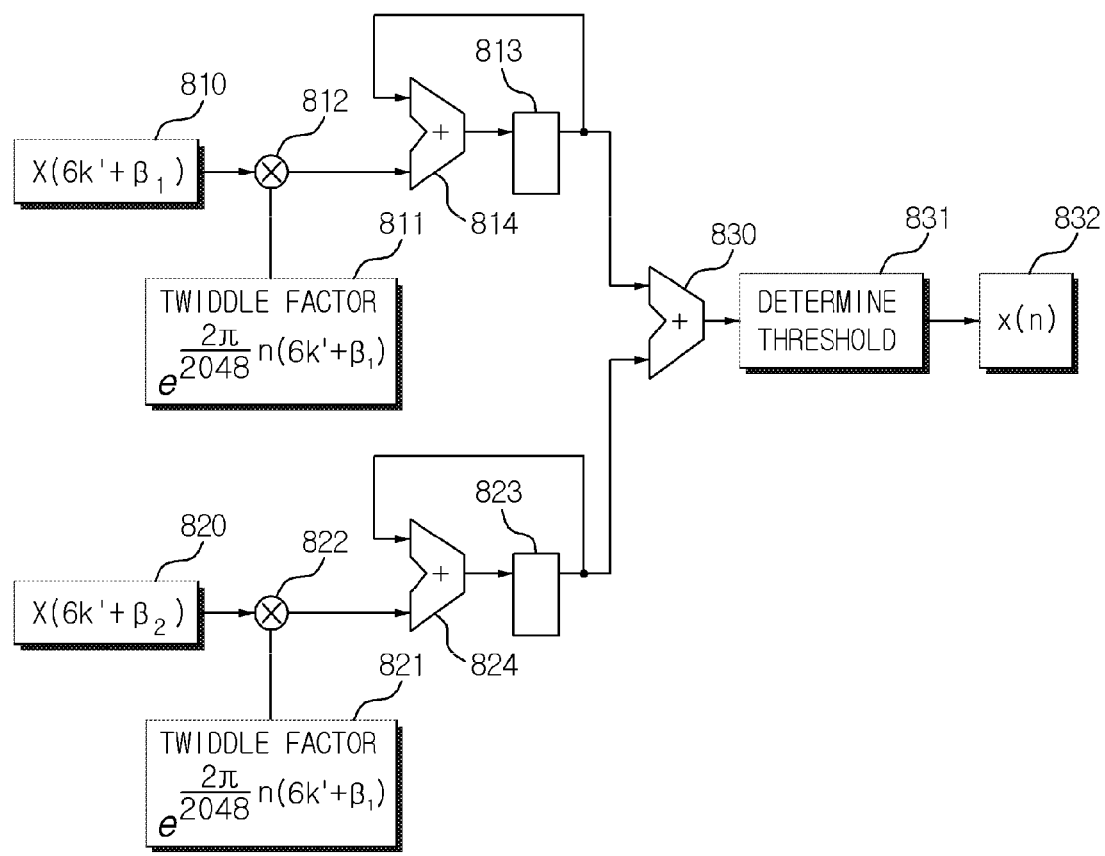
FIG. 8 is a diagram for describing a detailed implementation configuration of a multi-path estimation apparatus.

FIG. 8 is a diagram for describing a detailed implementation configuration of a multi-path estimation apparatus. FIG. 8 shows a detailed configuration of the multi-path estimation apparatus 703 of FIG. 7, and has a structure of implementing Equation 4.

Referring to FIG. 8, a result may be obtained 832 by determining 831 a threshold among values of the maximum delay spread of the time domain generated by multiplying 812 and 822 signals 810 and 820 input from a reference signal estimator by twiddle factors 811 and 821, accumulating the signals by using adders 814 and 824 and registers 813 and 823 110 times, and adding 830 both operation results based on the central subcarrier. Here, n can have a maximum of 256 values as the value of the maximum delay spread.

Accordingly, the delay spread of the time domain may be obtained without implementing 2048-Point inverse Fourier transform in the related art. As a result, memories used in the 2048-Point inverse fast Fourier transformer may be reduced, and thus a low power effect may be obtained in an actual circuit design, causing the receiving apparatus (or mobile communication terminal) to be easily implemented. It is also possible to maintain the same capability as that of the method using the conventional inverse fast Fourier transform.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A receiving apparatus in an OFDM system comprising:
    a receiver for receiving wireless signals transmitted through wireless channels;
    a transformer for transforming the wireless signals into signals of a frequency domain;
    an inverse transformer for inversely transforming reference signals into signals of a time domain based on a number of reference signals included in the signals of the frequency domain and an arrangement interval of the reference signals included in the signals of the frequency domain without inversely transforming data signals into the signals of the time domain; and
    a determiner for determining a delay spread based on the inversely transformed signals of the time domain.

2. The receiving apparatus of claim 1, wherein the receiving apparatus pre-stores information on the reference signals.

3. A receiving apparatus in an OFDM system comprising:
    a receiver for receiving wireless signals transmitted through wireless channels;
    a transformer for transforming the wireless signals into signals of a frequency domain;
    an inverse transformer for inversely transforming reference signals into signals of a time domain based on a number of reference signals included in the signals of the frequency domain and an arrangement interval of the reference signals included in the signals of the frequency domain; and
    a determiner for determining a delay spread based on the inversely transformed signals of the time domain,
    wherein the reference signals are disposed on subcarriers according to the arrangement interval.

4. The receiving apparatus of claim 3, wherein an inverse transform is separately performed based on a central subcarrier.

5. The receiving apparatus of claim 4, wherein the central subcarrier is allocated "0".

6. The receiving apparatus of claim 5, wherein the separately performed inverse transform has different offset values.

7. The receiving apparatus of claim 6, wherein the inverse transform is performed for a sample of a preset area for the reference signal transformed into the signal of the frequency domain.

8. The receiving apparatus of claim 7, wherein the preset area is a remaining area except for a central area sample of OFDM symbol samples.

9. The receiving apparatus of claim 8, wherein the determiner determines a maximum delay value of the inversely transformed signal of the time domain based on a preset threshold.

10. The receiving apparatus of claim 9, further comprising: an additional transformer for transforming the signal of the time domain corresponding to the determined maximum delay value into a signal of the frequency domain.

11. A receiving method in an OFDM system comprising the steps of:
    receiving wireless signals received through wireless channels by a receiver;
    transforming the wireless signals into signals of a frequency domain by a transformer;
    inversely transforming reference signals into signals of a time domain based on a number of reference signals included in the signals of the frequency domain and an arrangement interval of the reference signals included in the signals of the frequency domain without inversely transforming data signals into signals of a time domain, by an inverse transformer; and
    determining a delay spread based on the inversely transformed signals of the time domain by a determiner.

12. The receiving method of claim 11, wherein information on the reference signals is pre-stored.

13. A receiving method in an OFDM system comprising the steps of:
    receiving wireless signals received through wireless channels by a receiver;
    transforming the wireless signals into signals of a frequency domain by a transformer;
    inversely transforming reference signals into signals of a time domain based on a number of reference signals included in the signals of the frequency domain and an arrangement interval of the reference signals included in the signals of the frequency domain, by an inverse transformer; and
    determining a delay spread based on the inversely transformed signals of the time domain by a determiner,
    wherein the reference signals are disposed on subcarriers according to the arrangement interval.

14. The receiving method of claim 13, wherein an inverse transform is separately performed based on a central subcarrier.

15. The receiving method of claim 14, wherein the central subcarrier is allocated "0".

16. The receiving method of claim 15, wherein the separately performed inverse transform has different offset values.

17. The receiving method of claim 16, wherein the inverse transform is performed for a sample of a preset area for the reference signal transformed into the signal of the frequency domain.

18. The receiving method of claim 17, wherein the preset area is a remaining area except for a central area sample among OFDM symbol samples.

19. The receiving method of claim 18, wherein the step of determining the delay spread comprises determining a maximum delay value of the inversely transformed signal of the time domain based on a preset threshold, by the determiner.

20. The receiving method of claim 19, further comprising: the step of additionally transforming the signal of the time domain corresponding to the determined maximum delay value into a signal of the frequency domain.

* * * * *